United States Patent
Pilat et al.

(10) Patent No.: US 10,312,958 B2
(45) Date of Patent: Jun. 4, 2019

(54) REMOTE RECEIVE ANTENNA FOR VEHICLE COMMUNICATION SYSTEM

(71) Applicant: Gentex Corporation, Zeeland, MI (US)

(72) Inventors: Horia-Eduard Pilat, Pulheim (DE); Carl L. Shearer, Hudsonville, MI (US); Douglas C. Papay, Zeeland, MI (US); Steven L. Geerlings, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/772,923

(22) PCT Filed: Mar. 5, 2013

(86) PCT No.: PCT/US2013/029142
§ 371 (c)(1),
(2) Date: Sep. 4, 2015

(87) PCT Pub. No.: WO2014/137326
PCT Pub. Date: Sep. 12, 2014

(65) Prior Publication Data
US 2016/0020813 A1 Jan. 21, 2016

(51) Int. Cl.
*H04B 1/40* (2015.01)
*G07C 9/00* (2006.01)

(52) U.S. Cl.
CPC .......... *H04B 1/40* (2013.01); *G07C 9/00857* (2013.01); *G07C 2009/00865* (2013.01); *G07C 2009/00888* (2013.01); *G07C 2009/00928* (2013.01)

(58) Field of Classification Search
CPC . H04B 1/40; H04B 1/44; H04B 1/401; G07C 9/00857; G07C 2009/00865; G07C 2009/00888; G07C 2009/00928
(Continued)

(56) References Cited

U.S. PATENT DOCUMENTS 5,793,300 A 8/1998 Suman et al.
6,978,126 B1 * 12/2005 Blaker ............... G07C 9/00309
340/4.3
(Continued)

FOREIGN PATENT DOCUMENTS

CN 102473344.8 A 5/2012
EP 2 202 701 A2 6/2010
(Continued)

OTHER PUBLICATIONS

International Search Report in PCT/US2013/029142 dated Nov. 7, 2013, 4 pages.
(Continued)

*Primary Examiner* — Nay A Maung
*Assistant Examiner* — Angelica M Perez
(74) *Attorney, Agent, or Firm* — Foley & Lardner LLP; Bradley D. Johnson

(57) ABSTRACT

A communication system for a vehicle that includes a transceiver having a transmit antenna disposed adjacent to an exterior component of the vehicle, the transceiver being configured to transmit at least one signal to a receiver external to the vehicle. The communication system also includes a controller having a processor and a memory storage device, the memory storage device being configured to store the at least one signal and to output the at least one signal to the transceiver. The communication system also includes a remote receive antenna disposed within an interior of the vehicle and communicatively coupled to the memory storage device, wherein the remote receive antenna is configured to receive the at least one signal from a training transmitter and to output the at least one signal to the memory storage device.

20 Claims, 3 Drawing Sheets

(58) Field of Classification Search
USPC .................................. 455/66.1, 352, 345
See application file for complete search history.

(56) References Cited

U.S. PATENT DOCUMENTS

| | | |
|---|---|---|
| 2005/0088281 A1 | 4/2005 | Rohrberg et al. |
| 2007/0026898 A1* | 2/2007 | Nantz .................. H04B 1/005 455/562.1 |
| 2009/0237204 A1 | 9/2009 | Martin |
| 2010/0144284 A1* | 6/2010 | Chutorash ............. G08C 17/02 455/66.1 |
| 2010/0159846 A1* | 6/2010 | Witkowski ......... G07C 9/00857 455/70 |
| 2011/0001685 A1* | 1/2011 | Yukimoto ............. H01Q 1/242 343/905 |
| 2012/0126942 A1* | 5/2012 | Geerlings .......... G07C 9/00857 340/5.61 |
| 2012/0194408 A1* | 8/2012 | Rajalin ............... G06K 7/10158 343/894 |

FOREIGN PATENT DOCUMENTS

| | | |
|---|---|---|
| WO | WO-2010/125870 A1 | 11/2010 |
| WO | WO-2011/014483 A1 | 2/2011 |
| WO | WO2011/014483 * | 2/2011 |

OTHER PUBLICATIONS

Office Action dated Oct. 10, 2016, received in corresponding Chinese application No. 201380076285.0 (10 pages) and English translation (9 pages).

Second Office Action dated Jun. 20, 2017, in corresponding Chinese Application No. 2013800762850, 10 pages.

English translation of Second Office Action dated Jun. 20, 2017, in corresponding Chinese Application No. 2013800762850, 14 pages.

Third Office Action dated Apr. 2, 2018, in corresponding Chinese Application No. 2013800762850, 3 pages.

European Patent Office Examination Report dated Apr. 10, 2018, Application No. 13 711 775 .0, 5 pages.

Examination Report dated Jan. 11, 2019, in corresponding European application No. 13711775, 7 pages.

* cited by examiner

REMOTE RECEIVE ANTENNA FOR VEHICLE COMMUNICATION SYSTEM

CROSS REFERENCE TO RELATED APPLICATIONS

The present application is a U.S. National Stage of International Application No. PCT/US2013/029142 filed on Mar. 5, 2013, the disclosure of which is incorporated herein by reference.

BACKGROUND

The invention relates generally to a remote receive antenna for a vehicle communication system.

Certain vehicles include transmitters and/or transceivers that are compatible with a wide range of remote frequency (RF) systems. For example, home appliances, such as garage door openers, security gates, home alarms, lighting systems, and the like, may conveniently be operated by RF systems. Typically, the RF control is prepackaged together with the appliance. The RF control transmits an RF activation signal to the appliance, which is recognized by a receiver coupled to the appliance. Standalone universal RF controls are gaining in popularity as such devices can offer functionality different from the original equipment remote control. Such functionality includes decreased size, multiple appliance interoperability, increased performance, and the like. Universal RF controls are also purchased to replace lost or damaged controls or to simply provide another remote control for operating the appliance.

An example application for aftermarket remote controls are remote garage door opener controls integrated into an automotive vehicle. These integrated remote controls provide customer convenience, appliance interoperability, increased safety, and enhanced vehicle value. Present in-vehicle integrated remote controls provide a programmable garage door opener that learns characteristics of an activation signal received from an existing (e.g., training) transmitter. Then, when prompted by a user, the control generates a single activation signal having the same characteristics as the existing transmitter. Unfortunately, it may be difficult to train these controls. For example, if an in-vehicle integrated remote control system is mounted within a bumper of the vehicle, the operator goes outside of the vehicle in order to train the system. As a result, the process of training the system may be time consuming, especially when the operator has difficulty locating the control and/or during inclement weather. This means extended time for this activity, inaccuracy in detecting position, and dependency on weather, among other things.

BRIEF DESCRIPTION OF THE INVENTION

The present invention relates to a communication system for a vehicle that includes a transceiver having a transmit antenna disposed adjacent to an exterior component of the vehicle, the transceiver being configured to transmit at least one signal to a receiver external to the vehicle. The communication system also includes a controller having a processor and a memory storage device, the memory storage device being configured to store the at least one signal and to output the at least one signal to the transceiver. The communication system also includes a remote receive antenna disposed within an interior of the vehicle and communicatively coupled to the memory storage device, wherein the remote receive antenna is configured to receive the at least one signal from a training transmitter and to output the at least one signal to the memory storage device.

The present invention also relates to a communication system for a vehicle that includes a transceiver unit having a transmit antenna mounted adjacent to an exterior component of the vehicle, wherein the transceiver unit is configured to receive and store at least one signal, to receive an indication from a user to transmit the at least one signal, and to transmit the at least one signal to a receiver external to the vehicle. The communication system also includes a remote receive antenna mounted within an interior of the vehicle, wherein the remote receive antenna is configured to convey the at least one signal from a training transmitter to the transceiver unit for storage. The communication system further includes a cable configured to connect the remote receive antenna to the transceiver unit.

The present invention further relates to a method of installing a communication system for a vehicle that includes mounting a transmit antenna of a transceiver unit adjacent to an external component of the vehicle, wherein the transceiver unit is configured to receive and store at least one signal, to receive an indication from a user to transmit the at least one signal, and to transmit the at least one signal to a receiver external to the vehicle. The method also includes mounting at least one remote receive antenna within an interior of the vehicle, wherein the remote receive antenna is configured to convey the at least one signal from a training transmitter to the transceiver unit for storage. The method also includes connecting the transceiver unit to the remote receive antenna.

DRAWINGS

DETAILED DESCRIPTION

Figure 1:
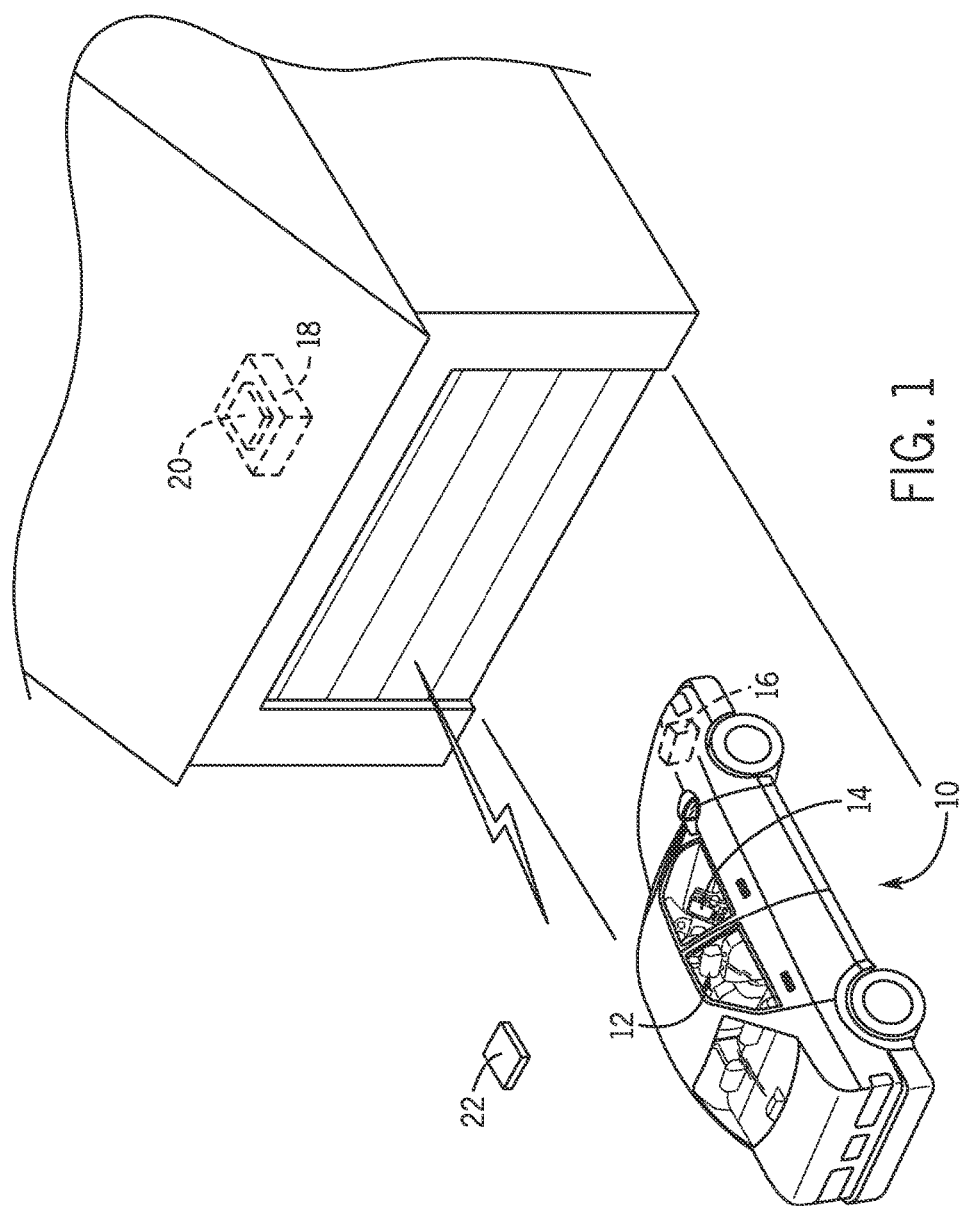
FIG. 1 is a perspective view of a vehicle having a communication system configured to provide a control signal to a remote device such as a garage door opener, according to an exemplary embodiment.

FIG. 1 is a perspective view of a vehicle 10 having an interior 12 and an instrument panel 14. The vehicle 10 includes a communication system 16 configured to provide a control signal (e.g., a formatted radio frequency (RF) signal) to a remote device 18. According to the embodiment shown in FIG. 1, the remote device 18 is a garage door opener for opening a garage door. The remote device 18 includes or is associated with a receiver 20 that receives the control signal and instructs (e.g., via one or more signals) the garage door opener to open the garage door based on the received control signal. The receiver 20 included or associated with the remote device 18, such as the garage door opener, is configured to instruct the remote device to actuate or change states only if the control signal is determined to be from an authorized device. The receiver 20 determines whether the control signal is from an authorized device based on characteristics of the control signal. For example, a receiver included or associated with the remote devices may be configured to instruct the remote device to actuate or change state if the control signal is sent at a certain frequency or frequencies, includes representations of particular codes, is formatted in a particular way, includes a certain cryptography key, is modulated a certain way, and the like.

The receiver 20 included or associated with the remote device 18 is associated with one or more original portable transmitters, such as the portable transmitter 22, which is configured to provide an appropriately formatted control signal to the receiver. The portable transmitter 22 may be an original transmitter sold with the remote device 18 and/or previously configured for communication with the receiver 20 of the remote device 18. The communication system 16 may not be pre-configured for communication with the particular remote device 18 when first sold to a user (with vehicle 10 or otherwise). The vehicle communication system 16 may be configured for wireless communication with the remote device 18 via one or more configuration processes (e.g., training processes, setup processes, etc.). For example, the communication system 16 may include an RF receiver configured to receive radio frequency control signals from the portable transmitter 22 and to store the received RF control signals for subsequent transmission to the remote device 18. According to other exemplary embodiments, the communication system 16 may include multiple stored codes for transmitting control signals and for actuating multiple types of remote devices, such as garage door openers. The communication system 16, including the transceiver unit, a controller, and a remote receive antenna, provides advantages that enable a vehicle occupant to program and operate the communication system 16 while remaining within the interior of the vehicle. As a result, the process of training the transceiver may be easier and more intuitive, thereby providing increased customer satisfaction.

Figure 2:
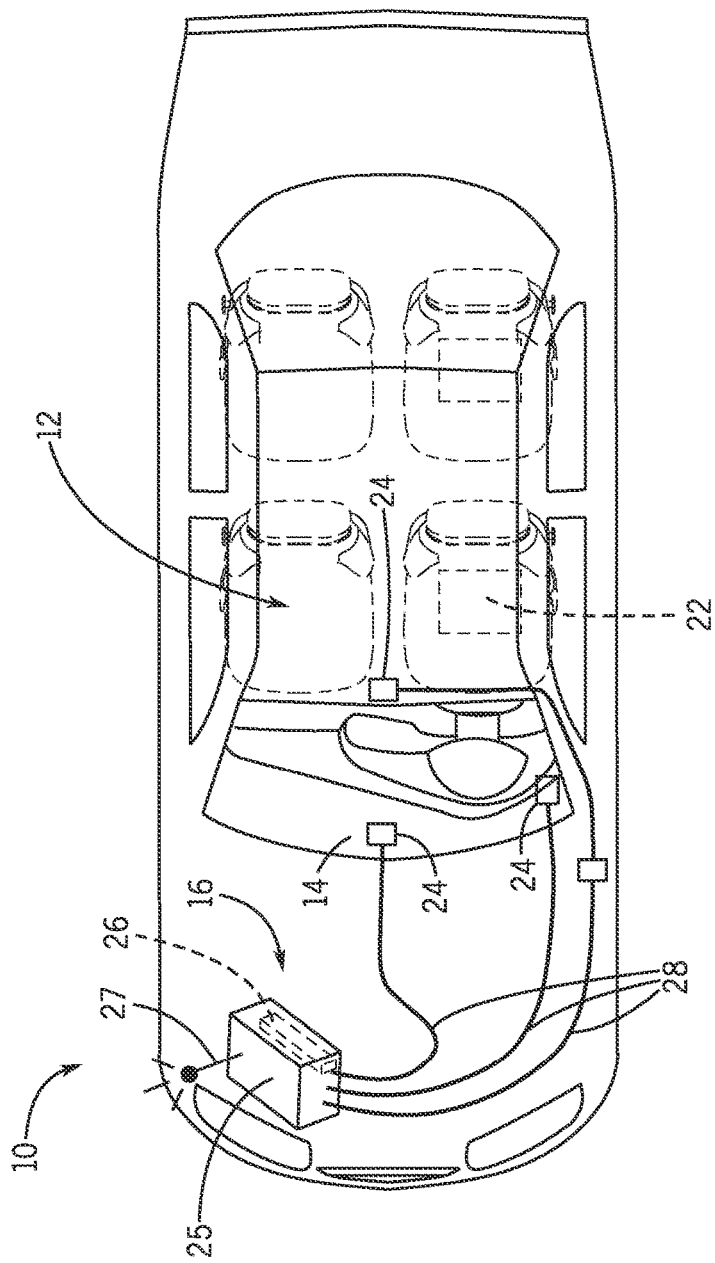
FIG. 2 is a schematic view of an embodiment of a vehicle having a communication system including a remote receive antenna.

FIG. 2 is a schematic view of the vehicle 10 having a communication system 16 including a remote receive antenna 24. The communication system 16 includes a transceiver module 25 mounted near a front of the vehicle 10. The transceiver module 25 may be mounted during original production of the vehicle 10, or may be mounted as part of an aftermarket upgrade to the vehicle 10. In one embodiment, the transceiver module 25 (e.g., including a transmit antenna 27) may be mounted to the bumper or other external vehicle component to facilitate enhanced communication between the communication system 16 and the remote device 18. The antenna 27 may be configured to transmit signals to the remote device 18, and may also be configured for reception of signals from the remote device 18. Such communication may be used, for example, at a security checkpoint or gate. The transceiver module 25 may be placed, in some embodiments, in other parts of the exterior or interior 12 of the vehicle 10 such as a roof or a hood. Any position that does not include areas within the interior 12 of the vehicle is considered part of the vehicle exterior. For example, an antenna 27 of the transceiver module 25 may be mounted to or within an external component of the vehicle (e.g., a component that forms part of the vehicle exterior), such as the bumper.

As illustrated, the communication system 16 includes multiple remote receive antennas 24 placed throughout the interior 12 of the vehicle 10. One or more of the antennas 24 may concurrently receive a signal from the portable transmitter 22. In certain embodiments, the communication system 16 may include a single antenna 24 placed in any of the three locations shown (e.g., the center console of the instrument panel, the overhead area along the periphery of the windshield, or the driver's side of the interior frame), or the single antenna may be placed in another location within the interior 12. It will be understood that one of ordinary skill in the art will be able to determine a suitable location for the antenna 24.

Placement of the antenna 24, in some instances, may follow guidelines that enable seamless operation of the communication system 16. For example, the antenna 24 may be placed in a non-visible area and/or in an area that is not directly reachable or touchable. In addition, the remote receive antenna 24 may be located at least about 10-20 centimeters, or about 13-17 centimeters, or about 15 centimeters away from a metal part. Furthermore, the remote receive antenna 24 may be located at least about 20-40 centimeters, or about 25-35 centimeters, or about 30 centimeters away from an electronic module such as a cluster, a display, a radio, a Global System for Mobile communication (GSM) module, or a transmit antenna. Still further, the remote receive antenna may be placed at least about 20-40 centimeters, or about 25-35 centimeters, or about 30 centimeters away from electric cables, such as power transmission cables, that carry a current higher than about 1-3 Amps, or about 2 Amps.

The remote receive antennas 24 are configured to receive a signal from the portable transmitter 22 and to communicate the signal through a cable 28 to the transceiver module 25. The cable 28 may be any suitable cable capable of communicating an electronic signal. In one embodiment, the cable 28 is a shielded coaxial cable connecting the transceiver module 25 to the remote receive antenna 24. In this embodiment, the remote receive antenna 24 may be an unshielded end of the coaxial cable, which acts as a monopole antenna. In an alternative embodiment, the remote receive antenna 24 can have different construction types with active antenna functionality. For example, the remote receive antenna 24 may include a complex impedance, or managing electronics physically integrated into the remote receive antenna 24. The complex impedance or the managing electronics may be used for measuring or controlling the remote receive antenna 24 and its connection to the transceiver module 25.

The communication system 16 may include a switch 26 that activates when the communication system 16 enters training mode. When activated, the switch 26 establishes a connection between the antenna 24 and the transceiver module 25. To review, the transceiver module 25 is configured to store a signal. To store the signal in memory, a driver (or another person) trains the transceiver module 25. To train the transceiver module 25, the driver activates the switch 26 (e.g., via a signal button, explained in detail below), which connects the transceiver module 25 to the remote receive antenna 24. With the switch 26 activated, the remote receive antenna 24 will convey a signal from the portable transmitter 22 through the cable 28 to the transceiver module 25. The transceiver module 25 stores the signal. At a later time, the driver may instruct the transceiver module 25 to transmit the signal that has been stored within the transceiver module 25 without handling or possessing the portable transmitter 22.

Figure 3:
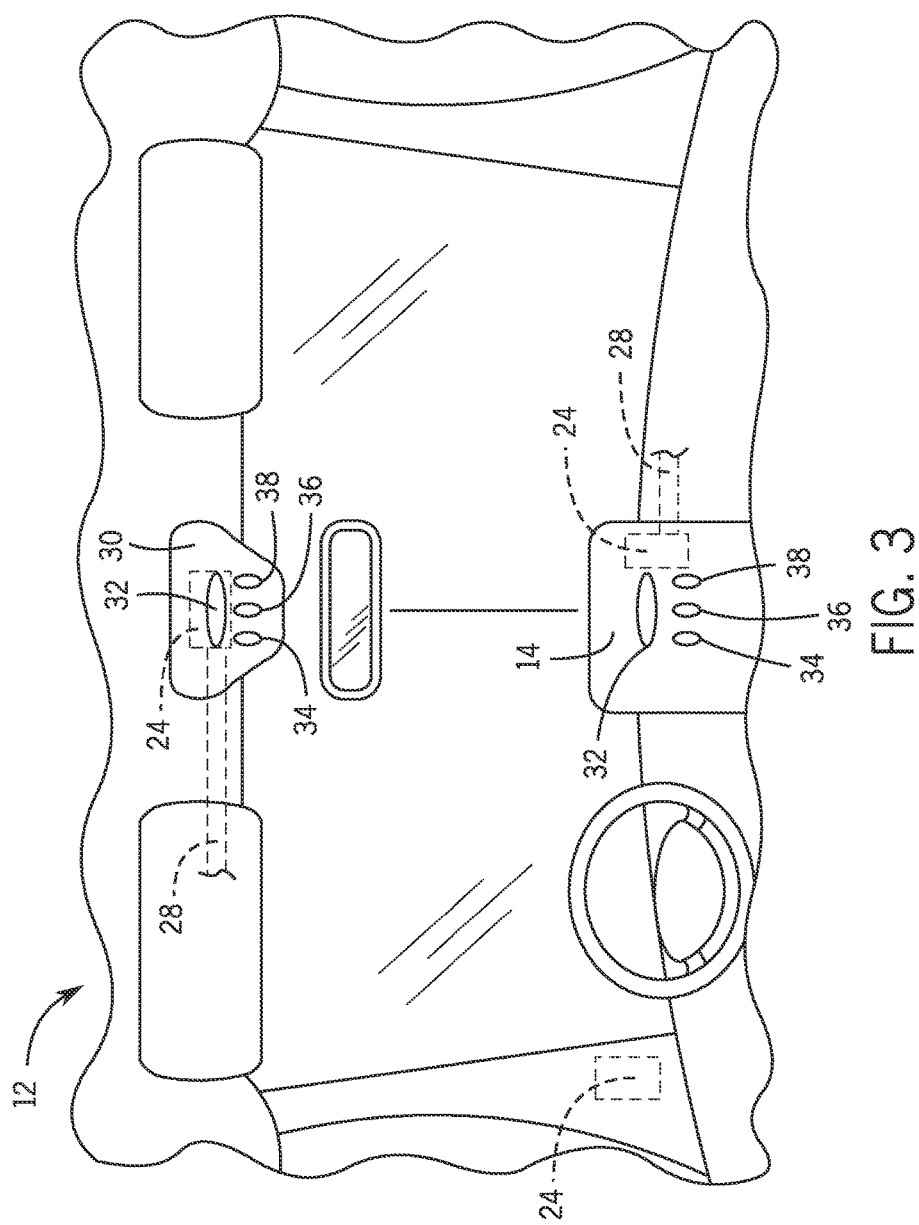
FIG. 3 is a perspective view of an embodiment of a front portion of an interior of a vehicle.

FIG. 3 is a perspective view of an embodiment of a front portion of an interior of a vehicle. The interior 12 includes the instrument panel 14 and an overhead panel 30. As illustrated, the instrument panel 14 and the overhead panel 30 include an indicator 32 and three RF signal buttons 34, 36, and 38. One function of the RF signal buttons 34, 36, 38 may be to instruct the communication system 16 to enter into training mode. Training mode activates the switch 26 connecting the remote receive antennas 24 to the transceiver module 25. During training mode, the remote receive antenna 24 receives a training signal from the portable transmitter 22. The remote receive antenna 24 may, in some embodiments, receive a signal from the portable transmitter 22 while the transmitter is within one meter of the remote receive antenna 24. To allow ease of use and accurate training of the communication system 16, the remote receive antenna 24 may include the indicator 32 that indicates to the driver the approximate location of the remote receive antenna 24. The indicator enables the driver to position the portable transmitter 22 within one meter of the remote receive antenna 24, for example. It may be helpful to position the indicator 32 near the RF signal buttons 34, 36, 38 as a driver may intuitively associate the area near the buttons with the communication system 16. The communication system 16 may store multiple signals as indicated by the different signal buttons 34, 36, 38. Signal button 34 may be for one remote device 18, such as a garage door, while signal button 36 may be for a different remote device 18, such as a security gate, and signal button 38 may be for a third remote device 18.

Thus, the training process from the perspective of a vehicle occupant is simple and straight-forward. The process of training the communication system 16 starts with the occupant in the vehicle 10 in possession of the portable transmitter 22. The occupant uses one, or multiple, of the signal buttons 34, 36, 38 to instruct the communication system 16 to enter into training mode. This may be done by tapping one of the signal buttons (e.g., 34) or holding the signal button (e.g., 34) for some extended amount of time (e.g., 3 seconds). The occupant may also press multiple signal buttons (e.g., 34 and 36) to indicate to the communication system 16 to enter into training mode. Other combinations or methods may also be used to instruct the communication system 16 to enter into training mode. Once the communication system 16 is in training mode, the occupant of the vehicle 10 broadcasts the signal from the portable transmitter 22. At this point, the remote receive antenna 24 picks up the signal from the portable transmitter 22 and conveys it to the transceiver module 25. The transceiver module 25 stores the signal for later transmission and connects the transmission of the signal to one of the signal buttons 34, 36, or 38.

Technical advantages of the foregoing embodiments include increased convenience when training a communication system within a vehicle. For vehicles in which a transceiver is mounted to an exterior component such as the bumper of the vehicle, the foregoing embodiments enable a driver to train the communication system without leaving the interior of the vehicle.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A communication system for a vehicle comprising:
a trainable transceiver module disposed outside an interior of the vehicle, the trainable transceiver module comprising:
a transceiver having a transmit antenna, wherein the transceiver is configured to transmit at least one first control signal to a receiver external to the vehicle; and
a controller having a processor and a memory storage device, wherein the memory storage device is configured to store at least one second control signal and to output the at least one first control signal to the transceiver;
a button on a panel disposed within an interior of the vehicle, configured to instruct, in response to a user input on the button, the trainable transceiver module to receive the at least one first control signal; and
a remote receive antenna disposed within the interior of the vehicle, wherein the remote receive antenna is configured to:
communicatively couple to the trainable transceiver module in response to the user input on the button;
receive the at least one second control signal from a training transmitter, and
relay, subsequent to the coupling to the trainable transceiver module, the at least one second control signal via a cable to the trainable transceiver module for training the trainable transceiver module, the cable extending between and connecting the remote receive antenna and the trainable transceiver module,
wherein the trainable transceiver module is configured to be trained using the at least one second control signal for transmitting the at least one first control signal and wherein the memory is configured to store the at least one second control signal received via the cable from the training transmitter.

2. The communication system of claim 1, wherein the cable comprises a shielded coaxial cable configured to connect the remote receive antenna to the memory storage device.

3. The communication system of claim 1, wherein the remote receive antenna is configured to be placed in an area of the interior not visible to an occupant of the vehicle.

4. The communication system of claim 1, wherein the remote receive antenna is positioned within the interior of the vehicle at least 30 centimeters away from an electronic module, from an electric power transmission cables, or a combination thereof.

5. The communication system of claim 1, comprising an indicator configured to indicate to an occupant of the vehicle an approximate location of the remote receive antenna to relay the at least one control signal from the training transmitter via the cable for training the trainable transceiver module.

6. The communication system of claim 1, wherein the remote receive antenna comprises a plurality of remote receive antennas positioned in multiple locations within the interior of the vehicle and each communicatively coupled to the memory storage device.

7. The communication system of claim 1, wherein the receiver comprises a garage door opener, house lights, an access gate, or any combination thereof.

8. The communication system of claim 1, comprising a user interface configured to control operation of the transceiver.

9. A communication system for a vehicle, comprising:
a trainable transceiver module disposed outside an interior of the vehicle, the trainable transceiver module having a transmit antenna, wherein the trainable transceiver module is configured to store at least first one control signal, to receive an indication from a user to transmit at least one second control signal, and to transmit the at least one second control signal to a receiver external to the vehicle;
a button on a panel disposed within an interior of the vehicle, configured to instruct, in response to a user input on the button, the trainable transceiver module to receive the at least first one control signal; and
a remote receive antenna mounted within the interior of the vehicle, wherein the remote receive antenna is configured to:
communicatively couple to the trainable transceiver module in response to the user input on the button, and
convey, subsequent to the coupling to the trainable transceiver module, the at least one first control signal from a training transmitter to the trainable transceiver module for training the trainable transceiver module via a cable;
wherein the cable extends between and is configured to connect the remote receive antenna to the trainable transceiver module,
wherein the trainable transceiver module is configured to be trained using the at least one first control signal for transmitting the at least one second control signal and to store the at least one first control signal received via the cable from the training transmitter.

10. The communication system of claim 9, wherein the cable comprises a shielded coaxial cable.

11. The communication system of claim 10, wherein the remote receive antenna comprises an unshielded end of the shielded coaxial cable.

12. The communication system of claim 9, wherein the remote receive antenna is configured to be placed in an area of the interior not visible to an occupant of the vehicle.

13. The communication system of claim 9, wherein the remote receive antenna is positioned within the interior of the vehicle at least 15 centimeters away from a metal component.

14. The communication system of claim 9, wherein the remote receive antenna is positioned adjacent to a driver seat.

15. The communication system of claim 9, comprising a switch configured to selectively connect the trainable transceiver module to the remote receive antenna.

16. A method of installing a communication system for a vehicle, comprising:
mounting a trainable transceiver module disposed outside an interior of the vehicle, wherein the trainable transceiver module includes a transmit antenna and is configured to receive at least one first control signal, to receive an indication from a user to transmit at least one second control signal, and to transmit the at least one second control signal to a receiver external to the vehicle;
disposing a button on a panel within an interior of the vehicle, wherein the button is configured to instruct, in response to a user input on the button, the trainable transceiver module to receive the at least one first control signal;
mounting at least one remote receive antenna within the interior of the vehicle, wherein the remote receive antenna is configured to:
communicatively couple to the trainable transceiver module in response to the user input on the button, and
convey, subsequent to the coupling to the trainable transceiver module, the at least one first control signal from a training transmitter to the trainable transceiver module for training the trainable transceiver module; and
connecting the trainable transceiver module to the remote receive antenna via a cable extending between and connecting the remote receive antenna and the trainable transceiver module for conveying the at least first one control signal from the training transmitter to the trainable transceiver module,
wherein the trainable transceiver module is configured to be trained using the at least one first control signal for transmitting the at least one second control signal and to store the at least one first control signal received via the cable from the training transmitter.

17. The method of claim 16, wherein the at least one remote receive antenna is configured to be placed in an area of the interior not visible to an occupant of the vehicle.

18. The method of claim 16, comprising connecting a switch to the trainable transceiver module, wherein the switch is configured to selectively connect the trainable transceiver module to the remote receive antenna.

19. The method of claim 16, wherein connecting the trainable transceiver module to the remote receive antenna comprises coupling a shielded coaxial cable to the trainable transceiver module and to the remote receive antenna.

20. The method of claim 19, wherein the remote receive antenna comprises an unshielded end of the shielded coaxial cable.

* * * * *